(12) United States Patent
Piringer et al.

(10) Patent No.: US 11,034,616 B2
(45) Date of Patent: Jun. 15, 2021

(54) SYSTEM HAVING A FURNACE AND METHOD FOR OPERATING SUCH A SYSTEM

(71) Applicants: MAERZ OFENBAU AG, Zürich (CH); thyssenkrupp AG, Essen (DE)

(72) Inventors: Hannes Piringer, Beinwil am See (CH); Patrick Bucher, Schönenwerd (CH)

(73) Assignees: MAERZ OFENBAU AG, Zürich (CH); THYSSENKRUPP AG, Essen (DE)

( * ) Notice: Subject to any disclaimer, the term of this patent is extended or adjusted under 35 U.S.C. 154(b) by 251 days.

(21) Appl. No.: 16/082,336

(22) PCT Filed: Mar. 3, 2017

(86) PCT No.: PCT/EP2017/054991
§ 371 (c)(1),
(2) Date: Sep. 5, 2018

(87) PCT Pub. No.: WO2017/153267
PCT Pub. Date: Sep. 14, 2017

(65) Prior Publication Data
US 2019/0077705 A1    Mar. 14, 2019

(30) Foreign Application Priority Data
Mar. 7, 2016  (DE) .................... 10 2016 104 076.2

(51) Int. Cl.
C04B 2/12      (2006.01)
F27B 1/04      (2006.01)
(Continued)

(52) U.S. Cl.
CPC .............. C04B 2/12 (2013.01); F27B 1/02 (2013.01); F27B 1/04 (2013.01); F27B 1/24 (2013.01);
(Continued)

(58) Field of Classification Search
CPC ...... C04B 2/12; F27B 1/24; F27B 1/02; F27B 1/04; F27B 1/26; F27B 1/28; F27D 19/00
See application file for complete search history.

(56) References Cited

FOREIGN PATENT DOCUMENTS

| CN | 105000811   | * 10/2015 |
| DE | 000B0017328 |   4/1956  |

(Continued)

OTHER PUBLICATIONS

English Translation of International Search Report issued in PCT/EP2017/054991, dated May 16, 2017 (dated May 23, 2017).

Primary Examiner — Steven S Anderson, II
(74) Attorney, Agent, or Firm — thyssenkrupp North America, LLC (57) ABSTRACT

A method of operating a plant having a furnace including at least two vertical shafts connected by an overflow duct, wherein at least one burner is arranged above the overflow duct in each case such that the burner gases therefrom flow downward in burning operation of the respective shaft. A cooling gas supply is provided beneath the overflow duct in each case such that, in combination with the operation of a burner in the burner-operated shaft, the burner gas flowing downward is deflected in the direction of the overflow duct by the cooling gas ascending in the burner-operated shaft, and a supply of cooling gas is adjusted such that the temperature of the burner charge through which the burner gas flows at least in the burner-operated shaft is kept above the deacidification temperature thereof.

12 Claims, 6 Drawing Sheets

(51) Int. Cl.
*F24B 1/24* (2006.01)
*F27B 1/26* (2006.01)
*F27B 1/28* (2006.01)
*F27D 19/00* (2006.01)
*F27B 1/24* (2006.01)
*F27B 1/02* (2006.01)

(52) U.S. Cl.
CPC .................. *F27B 1/26* (2013.01); *F27B 1/28* (2013.01); *F27D 19/00* (2013.01)

(56) References Cited

FOREIGN PATENT DOCUMENTS

| | | |
|---|---|---|
| DE | 2600254 C | 4/1978 |
| DE | 3038927 C | 5/1988 |
| EP | 1555251 A | 7/2005 |
| EP | 2478314 A | 7/2012 |
| FR | 2510984 A | 2/1983 |
| WO | 2015018504 A | 2/2015 |

\* cited by examiner

SYSTEM HAVING A FURNACE AND METHOD FOR OPERATING SUCH A SYSTEM

CROSS REFERENCE TO RELATED APPLICATIONS

This application is a U.S. National Stage Entry of International Patent Application Serial Number PCT/EP2017/054991, filed Mar. 3, 2017, which claims priority to German Patent Application No. DE 10 2016 104 076.2, filed Mar. 7, 2016, the entire contents of both of which are incorporated herein by reference.

FIELD

The present disclosure generally relates to a method of operating a plant having a furnace including two vertical shafts connected by means of an overflow duct.

BACKGROUND

DE 30 38 927 C2 illustrates furnaces that are referred to as cocurrent/countercurrent regenerative furnaces or by the abbreviation CCR furnaces, and are usually utilized for burning of carbonate-containing burner charge, especially limestone, dolomite or magnesite, work in a cyclical manner, wherein burning of the burner charge is always proceeding only in one of the shafts, while the other shaft is working as a regenerative shaft in which the burner charge therein is preheated by means of the flue gas supplied via the overflow duct from the currently burner-operated shaft for the subsequent burning cycle in this shaft. The burning of the burner charge in the burner-operated shaft is effected in cocurrent in that burner gas which is generated by burners disposed at the upper ends of the shafts flows through the burner charge conveyed from the top downward through the burner-operated shaft under gravity. By contrast, the flow through the burner charge in the non-burner-operated, i.e. regeneratively operated, shaft is in countercurrent, with the offgas supplied via the overflow duct being removed at the upper end of the regeneratively operated shaft.

Owing to the relatively long dwell time of the burner charge in the burning zone in combination with the relatively low burning temperatures of typically between 800° C. and 1000° C., conventional CCR furnaces are advantageously suitable for the production of quicklime having high reactivity, called soft-burnt lime. A disadvantage of conventional CCR furnaces with a direct overflow duct is that, in the starting section of the cooling zone of the burner-operated shaft which is beneath the overflow duct, partial recarbonization of the burner charge comes as a result of the relatively intensive mixing by means of the flue gas coming from the burner zone, which is deflected in the direction of the overflow duct in this region of the burner-operated shaft. With conventional CCR furnaces, therefore, calcination levels of 96% at best are currently possible.

Thus a need exists for a means of enabling, with a relatively high energy efficiency, calcination of carbonate-containing burner charge with a virtually complete level of calcination.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The disclosure relates to a method of operating a plant having a furnace including two vertical shafts connected by means of an overflow duct, wherein at least one burner is arranged above the overflow duct in each case such that the burner gases therefrom flow downward in burning operation of the respective shaft, and wherein a cooling gas supply is provided beneath the overflow duct in each case such that, in combination with the operation of a burner in the burner-operated shaft, the burner gas flowing downward or a flue gas comprising the burner gas is deflected in the direction of the overflow duct by the cooling gas ascending in the shaft. The disclosure further relates to a plant having such a furnace.

The invention is based on the concept of calcining the burner charge in a furnace that has the basic construction and hence also the advantages of a CCR furnace, especially with regard to the energy efficiency, but with the intention of preventing the temperature of the burner charge in the shafts in those regions of the cooling zones beneath the overflow channel in which flue gas is still flowing through the burner charge to a relevant degree from dropping to such an extent that this mixing leads to relevant recarbonization of the burner charge. Such prevention recarbonization can consequently avoid reduction of a high calcination level of the burner charge that was achievable beforehand in the burner zone to a relevant degree again, and so the outcome is that it is possible to produce burner charge having a calcination level corresponding roughly to that achievable in the burning zone. This calcination level may essentially be complete and may thus especially be greater than 99%.

In accordance with this basic concept, a method of operating a plant having a furnace has been provided, wherein the furnace comprises at least two vertical shafts connected by means of an overflow duct, wherein at least one burner is arranged above the overflow duct in each case such that the burner gases therefrom flow downward in burning operation of the respective shaft, and wherein a cooling gas supply is provided beneath the overflow duct in each case such that, in combination with the operation of a burner in the burner-operated shaft, the burner gas flowing downward or a flue gas comprising the burner gas is deflected in the direction of the overflow duct by the cooling gas ascending in the burner-operated shaft. What is envisaged in accordance with the invention is that the feed for the cooling gas and especially the flow rate and/or the temperature and/or the nature of the cooling gas is/are adjusted such that the temperature at least of the burner charge through which the burner gas or flue gas flows in the burner-operated shaft, preferably also of that in the regeneratively operated shaft, is kept above the deacidification temperature thereof.

According to the invention, the designation of the shafts of the furnace of the invention as "vertical" does not necessarily require that these or their longitudinal axes do indeed have an exactly vertical alignment. Instead, an exactly vertical direction component of the alignment should be sufficient, and, with regard to advantageous gravitational transport of the burner charge in the shafts, an angle between the actual alignment and exact vertical alignment of not more than 30°, preferably not more than 15° and more preferably of not more than 0° (exactly vertical alignment) should be provided.

In accordance with the basic concept of the invention, a plant of the invention with a furnace having two vertical shafts connected by means of an overflow duct, wherein at least one burner is arranged above the overflow duct in each case such that the burner gases therefrom flow downward in burning operation of the respective shaft, and wherein a cooling gas supply is disposed beneath the overflow duct in each case such that, in combination with the operation of a burner in the burner-operated shaft, the burner gas or flue gas flowing downward is deflected in the direction of the overflow duct by the ascending cooling gas, is characterized by a control device that provides for a state of operation for the furnace in which a supply of cooling gas and especially the flow rate and/or the temperature and/or the nature of the cooling gas is/are controlled, preferably by closed-loop control, such that the temperature at least of the burner charge through which the burner gas flows in the burner-operated shaft, preferably also of that in the regeneratively operated shaft, is kept above the deacidification temperature thereof.

In order to avoid recarbonization of the burner charge with maximum reliability, it may preferably be the case that the temperature at least of the burner charge through which the burner gas or flue gas flows in the burner-operated shaft beneath the overflow duct is kept above 800° C. For this purpose, the control device of the plant of the invention may provide for a corresponding state of operation for the furnace.

Further cooling of the burner charge in the cooling zones of the shafts beneath the overflow channel to temperatures below 800° C. should accordingly only be effected in sections in which, as a result of the deflection of the burner gas or flue gas in the direction of the overflow duct that has already been effected (in the case of the burner-operated shaft) or as a result of the deflection of the burner gas or flue gas in the direction of an outlet for the furnace offgas that has already been effected (in the case of the regeneratively operated shaft), there is no longer a relevant degree of flow of the burner gas or flue gas through the burner charge.

The method of the invention and the plant of the invention, by comparison with conventional operation of CCR furnaces, likewise envisage cooling of the burner charge in the cooling zones of the shafts, although the cooling effect envisaged is reduced at least in the sections of the cooling zones directly beneath the overflow duct. For ultimately sufficient cooling of the burner charge, it may therefore be advisable to correspondingly extend the length of the cooling zones of the shaft overall in order to increase the dwell time of the burner charge in the cooling zone. It is also possible with preference to remove the burner charge from the shafts with a relatively high temperature compared to conventional operation of CCR furnaces, because it is made possible in this way to operate a conventional CCR furnace in an inventive manner (as well) without any requirement for relevant structural alterations for the purpose. For example, the burner charge may be removed from the shafts at a temperature of still at least 200° C. and especially between 200° C. and 400° C. The control device for this purpose may provide for a corresponding state of operation for the furnace. By comparison, the temperature of the burner charge on removal from conventionally operated CCR furnaces is generally about 100° C. Final (active) cooling of the burner charge, especially until attainment of such a target temperature of about 100° C., in the case of a plant of the invention or in the case of operation of such a plant in accordance with the invention, can be effected especially in an aftercooler for the burner charge connected (preferably directly) downstream of the furnace. The control device of the plant of the invention may accordingly provide for a state of operation for the aftercooler of the plant in which the burner charge is cooled in the aftercooler to a temperature of not more than 100° C.

Since the burner charge is still storing a considerable amount of thermal energy on transfer from the shafts into the aftercooler, for implementation of a maximum efficiency of the method of the invention or of the plant of the invention, the waste heat from the aftercooler may be utilized by recuperation. The plant of the invention may have corresponding means for this purpose.

More particularly, the burner charge may be cooled in the aftercooler at least also by means of a cooling gas and especially cooling air, in which case this cooling gas which has then been heated (offgas from the aftercooler) is then utilized as combustion gas in the burner-operated shaft of the furnace in that it is at least partly mixed with a fuel supplied to the corresponding burner for combustion by means of this burner. For this purpose, the plant of the invention may comprise one or more connecting conduits that connect an offgas outlet from the aftercooler with a combustion gas supply to the shafts in each case. This can enable reduction in the amount of fuel required for the calcination of the burner charge in the burner-operated shaft.

Alternatively or additionally, the offgas coming from the aftercooler can also serve to preheat the burner charge in the furnace in some other way.

Again alternatively or additionally, the offgas from the aftercooler may at least partly also be intended for heating of fuel to be supplied to the furnace. For this purpose, the plant of the invention may comprise one or more connecting conduits that connect an offgas outlet from the aftercooler with a fuel supply for the burners of the shafts. What may especially also be envisaged here is drying of the fuel by means of a stream of the offgas coming from the aftercooler. This can be effected, for example, in a fuel mill connected upstream of the furnace of a plant of the invention with regard to the conveying direction of the fuel.

Again alternatively or additionally, what may also be envisaged is utilization of the offgas coming from the aftercooler for generation of mechanical energy and/or electrical power, for example by means of flow through what is called an ORC turbine (ORC: Organic Rankine Cycle). For this purpose, the plant of the invention may comprise a device for conversion of thermal energy stored in the offgas from the aftercooler to mechanical energy and/or electrical power, connected via one or more connecting conduits with an offgas outlet from the aftercooler.

A method of the invention and/or a plant of the invention are advantageously suitable for production of burnt material and especially quicklime having a calcination level of >99%. The starting material used for the burner charge may especially be limestone, dolomite or magnesite.

The shafts of the furnace of the invention may preferably have a round and especially circular cross-sectional form, or a tetragonal, especially rectangular, polygon-like or square cross-sectional form. However, other cross-sectional forms, especially other angular cross-sectional forms, are likewise advantageously implementable.

The furnaces 1 of the plants of the invention that are shown in the drawings each comprise two vertically aligned shafts 2 that are connected to one another by means of an overflow duct 3 arranged roughly at a height between the lower third and half of the longitudinal/vertical extent of the shafts 2. Each of the shafts 2 has, at its upper end, especially in the upper end face, a burner charge feed 4 not shown in detail, in a closable form. In addition, each of the shafts 2 has, at its lower end, especially in the lower end face, a burner charge outlet 5 likewise not shown in detail, likewise in a closable form. In addition, each of the shafts 2 has been provided with a cooling gas supply 6 which is disposed in the region of the lower end and may especially be integrated into the respective lower end face. In the region of the upper end, each of the shafts 2 comprises a multitude of burners 7 which may have burner lances that are guided through the respective side wall into the corresponding shaft interior and are angled by about 90° therein. As a result, the burner openings of the burner lances are aligned in the direction of the lower end of the respective shaft 2.

In the operation of such a furnace 1, burner charge is transported from the upper burner charge feed 4 down to the burner charge outlet 5 either within the burner-operated shaft 2 or within the regeneratively operated shaft or simultaneously within both shafts in a continuous or intermittent manner as a result of controlled removal. The burner charge here is guided first through a preheating zone 8 that extends between the burner charge supply 4 and roughly the burner openings of the burners 7 and in which the burner charge is to be preheated, and subsequently through a burner zone 9 that extends roughly proceeding from the burner openings of the burners 7 as far as the level of the overflow duct 3. Proceeding from the overflow duct 3, there is then an adjoining cooling zone 10. In the course of transport of the burner charge through these zones, the individual particles of the burner charge are thus first preheated in the preheating zone 8, then burnt in the burning zone 9 and calcined therein until attainment of a defined degree of calcination. In the cooling zone 10, there is then a first cooling of the burner charge by means of a cooling gas, which may especially be cooling air, supplied to the shafts 2 via the cooling gas feeds 6. The cooling air may especially have been sucked in from the environment.

The burning of the burner charge in the burner zone 9 of the burner-operated shaft 1 is effected by the generation of thermal energy by means of the burner 7 in that it is supplied with a liquid, gaseous and/or pulverulent fuel. This fuel exits from the burners 7 at the end face, where it burns with a combustion gas (especially combustion air). The combustion gas may be fed in separately via a combustion gas feed 11. Another possibility is supply via the burner lances themselves.

Figure 1:
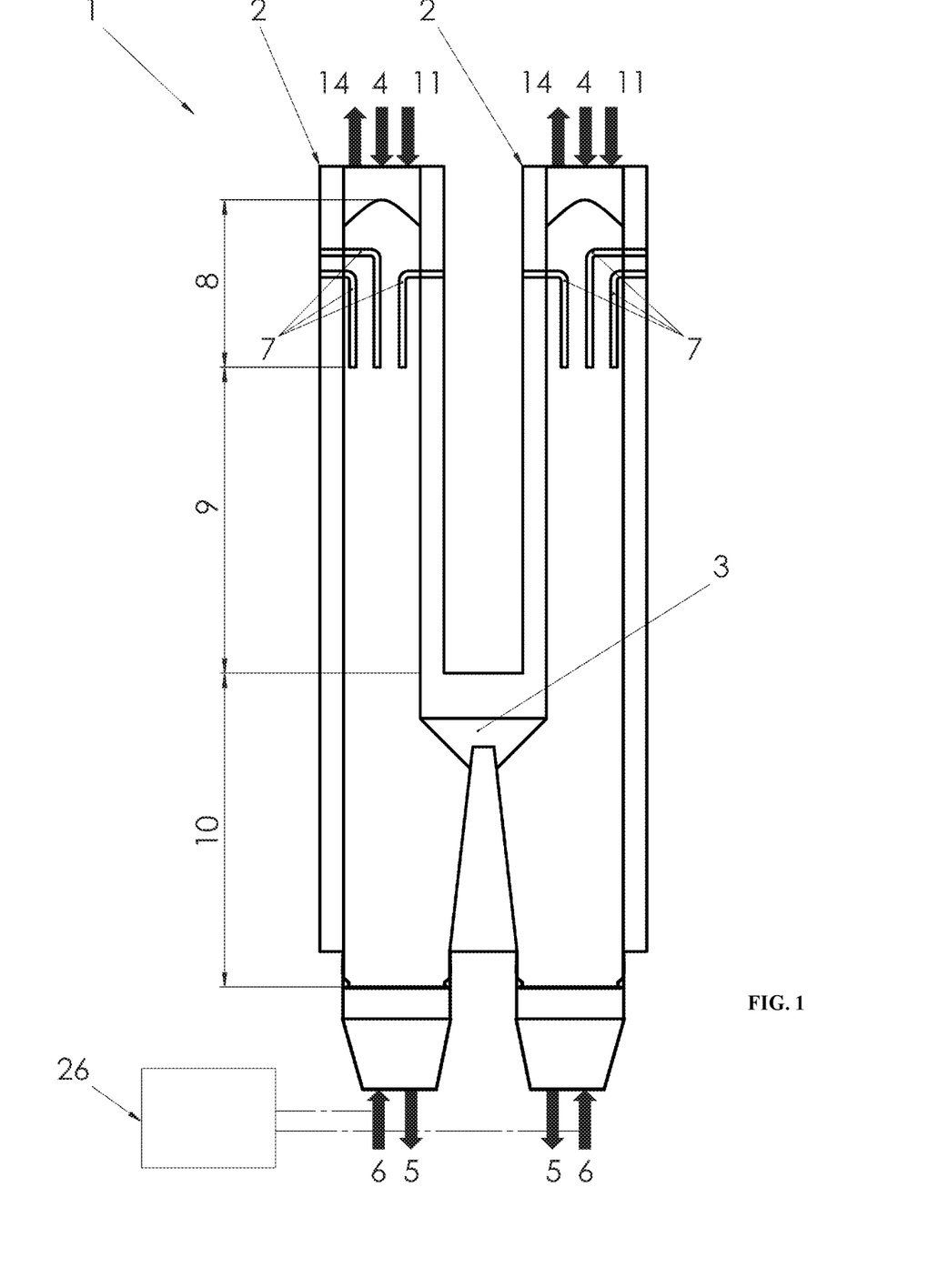
FIG. 1 is a vertical sectional view of a plant of the invention with the furnace in a first embodiment.
Figure 2:
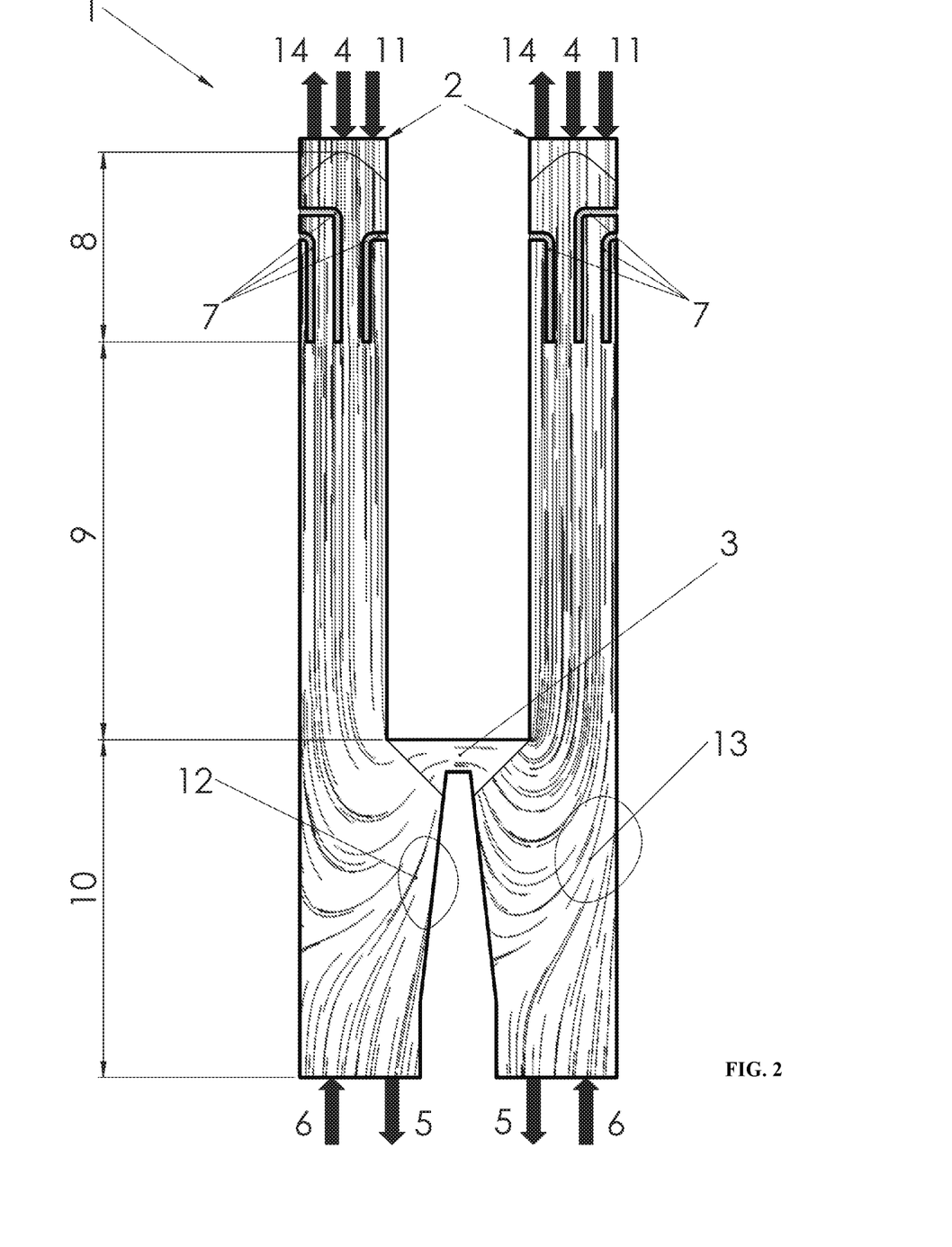
FIG. 2 is a vertical sectional view of the flow conditions in the furnace according to FIG. 1 during burning operation in the shaft shown on the left.

The flue gas that arises in the calcination of the burner charge in the burner zone 9, consisting essentially of the flue gas generated by the burners 7 and carbon dioxide released in the calcination of the burner charge, in a section of the cooling zone 10 that extends from the overflow duct 2 up to about half the height of the cooling zone 10, meets the cooling gas that flows through the burner charge proceeding from the cooling gas feed 6 in the direction toward the overflow duct 3 (cf. FIG. 2). This deflects the flue gas in the direction of the overflow duct 3, and it flows together with the cooling gas supplied to the burner-operated shaft over into the regeneratively operated shaft 2. The flue gas which has flowed over into the regeneratively operated shaft 2, which is then composed essentially of the burning gases from the burners 7, the carbon dioxide released in the calcination of the burner charge in the burning zone 9 and the cooling gas from the fuel-operated shaft 2, flows through that burner charge which is disposed within the regeneratively operated shaft 2 in a section beneath the overflow duct 3 and within the entire section above the overflow duct 3. This preheats this burner charge for burning in a subsequent cycle in the operation of the furnace 1, in which the shaft 2 that was previously in burning operation is then operated regeneratively and the shaft 1 that was previously in regenerative operation is put into burning operation. In the course of flow through the regeneratively operated shaft 2, the flue gas that has flowed over mixes with cooling gas that has been supplied to the regeneratively operated shaft 2 via the corresponding cooling gas feed 6.

Flow of the flue gas through the burner charge that has already been calcined in the two shafts 2 within the respective cooling zones 10 can lead to recarbonization of the burner charge if it already has a relatively low temperature of less than 800° C. in particular. Particularly the regions of the shafts 2 indicated by reference numerals 12 and 13 in FIG. 2 can be found here to be particularly problematic because, in these regions 12, 13, an already marked cooling effect by the cooling gas co-operates with a still-intense flow of the flue gas through the burner charge. In order to largely prevent recarbonization of the burner charge in these regions 12, 13 too, what is envisaged in accordance with the invention is to adjust the cooling of the burner charge by the cooling gas in the two shafts 2 such that there is a temperature of the burner charge of at least 800° C. even there, and hence at any point in the furnace 1 where there is intense flow of the flue gas through the burner charge. This is effected in a simple manner by closed-loop control of the flow rates of the cooling gas supplied to the two shafts 2, which is reduced by about 15% to 20% by comparison with conventional operation of a structurally comparable CCR furnace for which cooling is envisaged such that the burner charge is removed from the shafts at a temperature of about 100° C. with otherwise unchanged cooling gas parameters (in particular type and temperature of the cooling gas). Closed-loop control of the supply of cooling gas via the cooling gas feeds 6 is effected by means of a control device 26 of the plant.

The furnace offgas consisting of the flue gas that has flowed over from the burner-operated shaft 2 and the cooling gas that has been supplied to the regeneratively operated shaft 2, once it has flowed through the burner charge above the overflow duct 3 in the regeneratively operated shaft 2, is removed via an offgas outlet 14 that belongs to this shaft 2.

As a result of the relatively low flow rates of the cooling gas supplied to the two shafts 2, the burner charge is removed from the shafts 2 at a temperature of about 200° C. to 400° C. This removal temperature is thus much higher than the about 100° C. at which removal of the burner charge from the shafts 2 is effected in the case of a comparable, conventionally operated furnace. In order to cool the burner charge that has been removed from the furnace 1 sufficiently rapidly to the temperature of about 100° C. which is already suitable for further use, it can be transferred from the furnace 1 directly into an aftercooler 15. In this case, there may be an intervening lock system, the locks of which are movable, for example, by hydraulic or pneumatic means or with an electric motor.

FIGS. 3 to 6 show various configurations of such an aftercooler 15 of a plant of the invention. All these aftercoolers 15 utilize a cooling gas and especially cooling air that may have been sucked in from the environment as ambient air for further cooling of the burner charge, and direct cooling in particular may be envisaged, in which the cooling gas flows through the burner charge (cf. FIGS. 3 to 5). However, the advantage of a particularly good cooling effect of such direct cooling is opposed by the disadvantage of having to dedust the offgas from the aftercooler 15, depending on the use for which it is intended, because burner charge particles are entrained in a relevant amount as they flow through the burner charge. Such dedusting of the offgas from the aftercooler 15 can be avoided when indirect cooling is provided, in which the cooling gas merely flows around a vessel that accommodates the burner charge.

Figure 3:
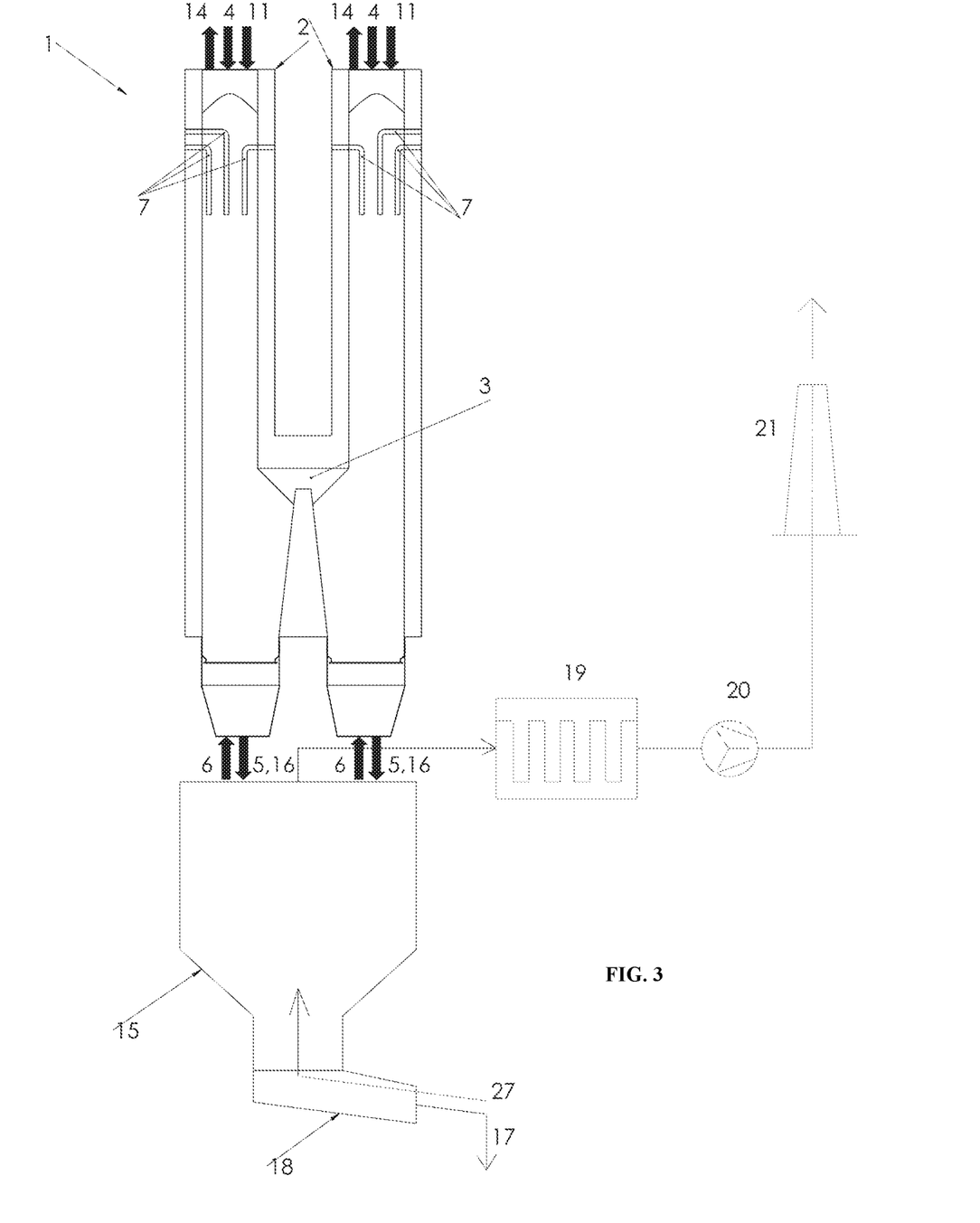
FIG. 3 is a vertical sectional view of a plant of the invention with a furnace and an aftercooler in a second embodiment.

In the aftercooler 15 according to FIG. 3, the burner charge moves under gravity, proceeding from burner charge feeds 16 of the aftercooler 15 that are connected directly to the burner charge outlets 5 of the furnace 1 as far as a burner charge outlet 17 of the aftercooler 15, while a cooling gas supplied via a cooling gas feed 27, for example in the region of the burner charge outlet 17 of the aftercooler 15, flows through it in countercurrent. A conveying device may be integrated into the burner charge outlet 17 of the aftercooler 15, which ensures continuous removal of the burner charge and may be executed, for example, in the form of a vibrating channel 18. The offgas from the aftercooler 15 that has been removed at the upper end of the aftercooler 15 and heated by heat transfer from the burner charge is subsequently dedusted in a dust filter 19 and removed to the atmosphere via a chimney 21 by means of an offgas ventilator 20.

Figure 4:
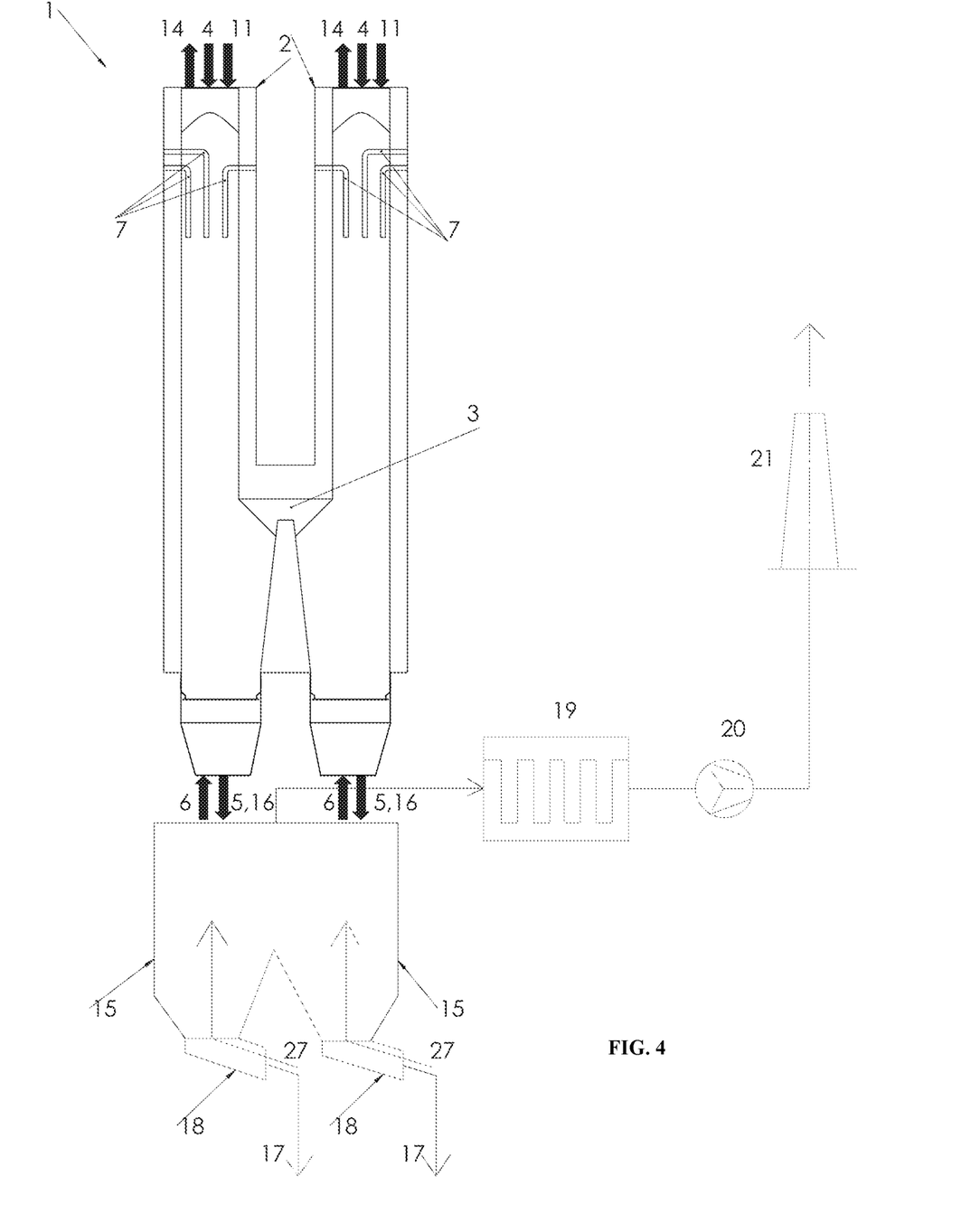
FIG. 4 is a vertical sectional view of a plant of the invention with a furnace and an aftercooler in a third embodiment.

The plant shown in FIG. 4 differs from that according to FIG. 3 merely in that a separate aftercooler 15 is provided in each case for the two shafts 2 of the furnace 1, with each of the aftercoolers 15 being supplied separately with cooling gas. The streams of heated cooling gas coming from the two aftercoolers 15 heated cooling gas (offgas from the aftercoolers 15) are supplied together to a dust filter 19 and removed via a chimney 21 by the action of an offgas ventilator 20. The supply of cooling gas for the two aftercoolers 15 may be individually controllable by open-loop or closed-loop control.

Figure 5:
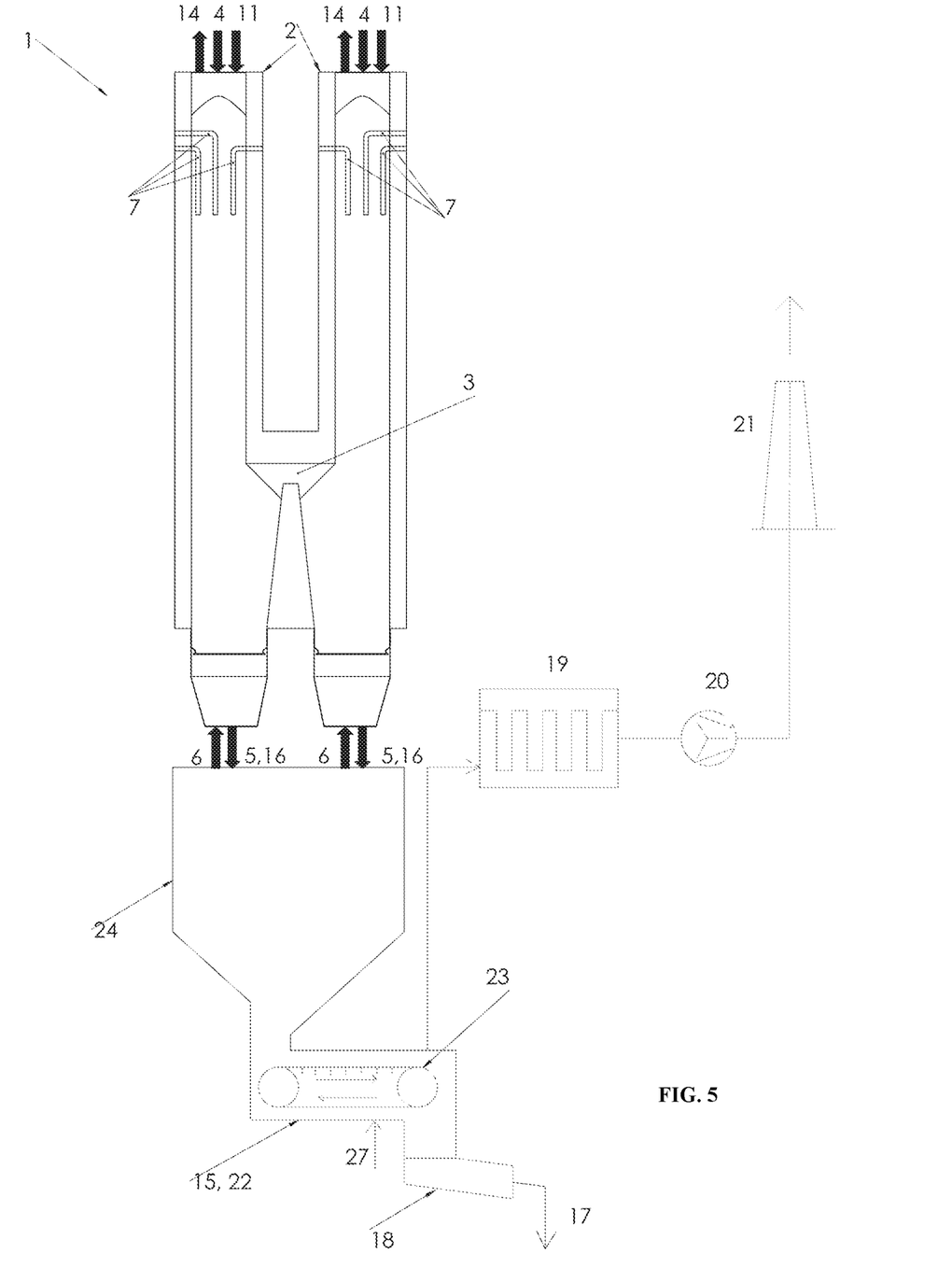
FIG. 5 is a vertical sectional view of a plant of the invention with a furnace and an aftercooler in a fourth embodiment.

The aftercooler 15 shown in FIG. 5 comprises a cooling section 22 within which there is disposed a conveying device 23 through which the cooling gas can flow, through which the burner charge is transported proceeding from the outlet of an introduction bunker 24 connected upstream of the cooling section 22 in the direction of a vibrating channel 18 (or some other kind of conveying device) that conveys the burner charge to a burner charge outlet 17. In the course of this, the cooling gas that has been supplied to the cooling section 22 of the aftercooler 15 in the vicinity of the outlet of the introduction bunker 24 flows through the burner charge disposed on the conveying device 23, which cools it down until attainment of a target temperature of, for example, about 100° C. The cooling gas removed again from the cooling section 22 of the aftercooler 15 in the vicinity of the vibrating channel 18 is then dedusted in a dust filter 19 and removed via a chimney 21 by means of an offgas ventilator 20.

Figure 6:
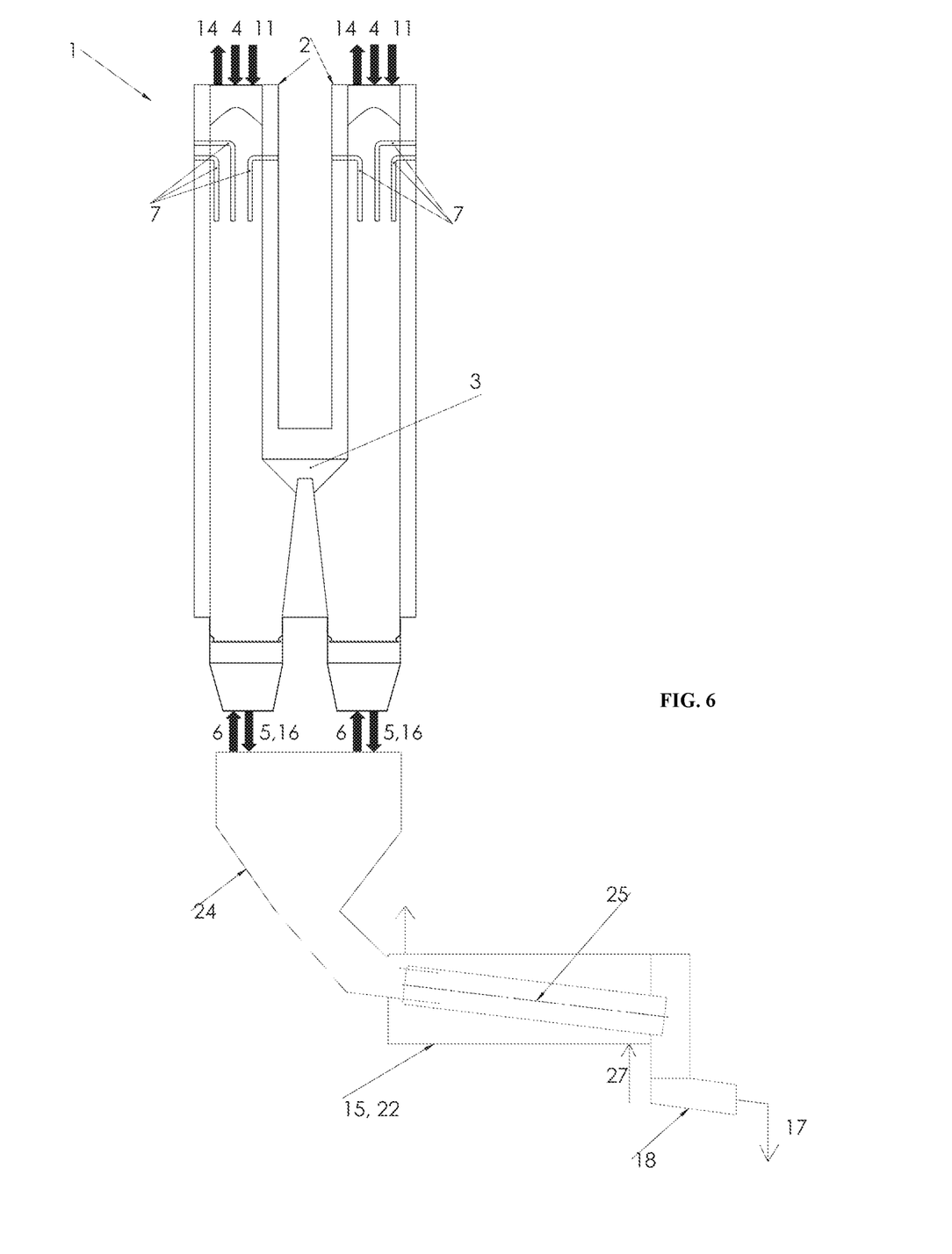
FIG. 6 is a vertical sectional view of a plant of the invention with a furnace and an aftercooler in a fifth embodiment.

In the aftercooler according to FIG. 6, a cooling section 22 is likewise combined with an introduction bunker 24 connected upstream and a vibrating channel 18 (or some other kind of conveying device) connected downstream. Within the cooling section 22 there is a rotary tube 25, i.e. a rotationally drivable tube, through which the burner charge can be conveyed, the tube having an alignment tilted downward in the direction of its discharge end and hence in the direction of the vibrating channel 18. The burner charge is thus conveyed within the rotary tube 25 under the action of gravity in conjunction with movement of the burner charge within the rotary tube 25 as a result of its being driven with rotation. The burner charge accommodated within the rotary tube 25 may be cooled indirectly in that the cooling gas merely flows around the rotary tube 25, as also shown in FIG. 6. On the other hand, it is also possible to guide the cooling gas through the inner volume of the rotary tube 25, which achieves direct cooling of the burner charge accommodated therein. It would be possible here to guide the cooling gas through the rotary tube preferably in countercurrent to the conveying direction of the burner charge. One advantage that arises from indirect cooling of the burner charge is that it is possible to dispense with dedusting of the cooling gas, and the burner charge, especially when it is in the form of quicklime, does not react with the water ($H_2O$) from the cooling air ($CaO + H_2O \rightarrow Ca(OH)_2$).

If the temperature of the heated offgas from an aftercooler 15 of a plant of the invention should be too high for a dust filter 19 connected downstream thereof or any alternatively utilized dedusting device, it may be advisable to lower the offgas temperature to a maximum permissible value, for example by mixing relatively cold ambient air with the offgas.

After removal of the offgas from the aftercooler 15 to the atmosphere, the thermal energy still stored therein may be utilized by recuperation in that it is supplied, for example, at least partly via the corresponding combustion gas feed 11 as combustion gas to the burner-operated shaft 2 of the furnace 1. Additionally or alternatively, the offgas from the aftercooler 15 can also serve for preheating and especially also for drying of a fuel, especially a pulverulent fuel, to be supplied to the burner-operated shaft 2. For this purpose, the offgas can especially be guided through a fuel mill (not shown) in which it flows through the fuel which is being ground therein to a grain size suitable for utilization in the furnace 1. In addition, it is possible to utilize the thermal energy still stored in the offgas from the aftercooler 15 for generation of mechanical energy and/or electrical power by means, for example, of an ORC turbine (not shown).

What is claimed is:

1. A method of operating a plant having a furnace comprising:
    two vertical shafts, an overflow duct connecting the two vertical shafts,
a burner disposed in each of the two vertical shafts above the overflow duct and configured such that burner gas therefrom flows downward in burning operation of each of the two vertical shafts, and
a cooling gas supply disposed in each of the two vertical shafts beneath the overflow duct and configured such that, in combination with the operation of the burner in a burner-operated shaft of the two vertical shafts, the burner gas flowing downward is deflected in the direction of the overflow duct by ascending cooling gas from the cooling gas supply,
the method comprising:
adjusting a supply of the cooling gas such that the temperature of burner charge through which the burner gas flows in the burner-operated shaft of the two vertical shafts is kept above the deacidification temperature thereof; and
removing the burner charge from the two vertical shafts while the burner charge is at least 200° C.

2. The method of claim 1, wherein the temperature of the burner charge through which the burner gas flows is kept above 800° C.

3. The method of claim 1, further comprising discharging the burner charge from the two vertical shafts and transferring the discharged burner charge into an aftercooler.

4. The method of claim 3, comprising cooling the burner charge in the two vertical shafts by means of the cooling gas to a temperature of not less than 200° C. and/or cooling the burner charge in the aftercooler down to a temperature of not more than 100° C.

5. The method of claim 3, comprising cooling the burner charge in the two vertical shafts by means of the cooling gas to a temperature between 200° C. and 400° C. and/or cooling the burner charge in the aftercooler down to a temperature of not more than 100° C.

6. A plant comprising:
a furnace including two vertical shafts,
an overflow duct connecting the two vertical shafts,
a burner disposed above the overflow duct and such that burner gas therefrom flows downward in burning operation of each of the two vertical shafts,
a cooling gas supply disposed beneath the overflow duct and in each of the two vertical shafts such that, in combination with the operation of the burner in a burner-operated shaft of the two vertical shafts, the burner gas flowing downward is deflected in the direction of the overflow duct by ascending cooling gas from the cooling gas supply, and
a control device that is configured to provide for a state of operation for the furnace in which the cooling gas supply is controlled such that the temperature of a burner charge through which the burner gas flows in the burner-operated shaft of the two vertical shafts is kept above the deacidification temperature thereof and such that the burner charge is at least 200° C. upon removal from the two vertical shafts.

7. The plant of claim 6, wherein the control device is configured to provide for a state of operation for the furnace in which the temperature of the burner charge through which the burner gas flows at least in the two vertical shafts is kept above 800° C.

8. The plant of claim 6, wherein the control device is configured to provide for a state of operation for the furnace in which the burner charge is cooled in the two vertical shafts by means of the cooling gas to a temperature of not less than 200° C.

9. The plant of claim 6, wherein the control device is configured to provide for a state of operation for the furnace in which the burner charge is cooled in the two vertical shafts by means of the cooling gas to a temperature between 200° C. and 400° C.

10. The plant of claim 6, further comprising an aftercooler for the burner charge connected downstream of the furnace.

11. The plant of claim 9, wherein the control device is configured to provide for a state of operation for the aftercooler in which the burner charge is cooled in the aftercooler until attainment of a temperature of not more than 100° C.

12. The plant of claim 9, further comprising one or more connecting lines that connect an offgas outlet of the aftercooler to a burner gas supply to the two vertical shafts in each case and/or to a fuel supply for the burners of the two vertical shafts and/or to a device for conversion of thermal energy from offgas from the aftercooler to mechanical energy and/or electrical power.

* * * * *